(12) United States Patent
Yamamoto et al.

(10) Patent No.: US 6,399,733 B1
(45) Date of Patent: Jun. 4, 2002

(54) PROCESS FOR PREPARING A HIGHLY PURE SILICONE LADDER POLYMER

(75) Inventors: Shigeyuki Yamamoto; Naoki Yasuda; Motohisa Taguchi, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/686,063

(22) Filed: Oct. 11, 2000

(30) Foreign Application Priority Data

Apr. 4, 2000 (JP) ........................................ 2000-102716

(51) Int. Cl.$^7$ ................................................ C08G 77/06
(52) U.S. Cl. ........................... 528/12; 528/10; 528/31; 528/33; 528/39; 556/466; 556/467; 556/484; 525/474
(58) Field of Search ................................ 528/10, 12, 31, 528/33, 39; 556/466, 467, 484; 525/474

(56) References Cited

U.S. PATENT DOCUMENTS

| 5,081,202 A | | 1/1992 | Adachi et al. | |
| 5,179,185 A | | 1/1993 | Yamamoto et al. | |
| 5,183,846 A | * | 2/1993 | Aiba et al. | 524/865 |
| 5,236,984 A | | 8/1993 | Yamamoto et al. | |
| 5,399,648 A | | 3/1995 | Yamamoto et al. | |
| 5,679,822 A | * | 10/1997 | LeGrow et al. | 556/455 |
| 5,859,162 A | * | 1/1999 | Yamamoto et al. | 528/31 |

FOREIGN PATENT DOCUMENTS

| JP | 60-124943 | 7/1985 |
| JP | 8-245792 | 9/1996 |
| JP | 11-292971 | 10/1999 |

* cited by examiner

Primary Examiner—Robert Dawson
Assistant Examiner—Jeffrey B. Robertson
(74) Attorney, Agent, or Firm—Leydig, Voit & Mayer, Ltd.

(57) ABSTRACT

A process for preparing a highly pure silicone ladder polymer of the general formula (1):

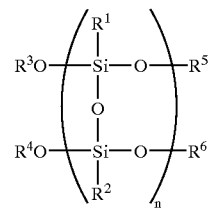

wherein $R^1$ and $R^2$ represent F, H, a lower alkyl group, an alkenyl group, an aryl group, a lower fluorinated alkyl group, a fluorinated alkenyl group or a fluorinated aryl group; $R^3$, $R^4$, $R^5$ and $R^6$ each represents H, a lower alkyl group or a lower fluorinated alkyl group; and n represents an integer of 5 to 10000,
which comprises:

(a) a step of obtaining a prepolymer in which at least one organosilane compound is dissolved in an organic solvent and hydrolyzed with ultrapure water;

(b) a step of washing the obtained prepolymer with ultrapure water; and, (c) a step of dissolving the washed prepolymer in an organic solvent and heating without a catalyst.

10 Claims, No Drawings

PROCESS FOR PREPARING A HIGHLY PURE SILICONE LADDER POLYMER

BACKGROUND OF THE INVENTION

The present invention relates to a process for preparing a highly pure silicone ladder polymer. More particularly, the invention relates to a process for preparing a highly pure silicone ladder polymer capable of being employed preferably as a protective film and an interlaminar insulating film of a semiconductor.

A silicone ladder polymer has been employed as a protective film and an interlaminar insulating film of an electronic part or a semiconductor device because of its excellence in terms of the heat resistance, the electric insulating capability and the chemical resistance which is attributable to its molecular structure. A conventional process for preparing such silicone ladder polymer is proposed in a reference (Japanese Unexamined Patent Publication No. 1985-124943). In a conventional process, triethoxysilane is first hydrolyzed in a solution of an organic solvent and then allowed to polymerize under reduced pressure to modify terminals with dimethylchlorosilane and then purified with an organic solvent, whereby yielding a silicone ladder polymer.

However, even if such conventional process can produce a silicone ladder polymer, the resulting silicone ladder polymer contains a large amount of impurities and by-products. This is because of an insufficient purification after the modification of terminals or because of a manufacturing condition making it difficult to remove the impurities and the by-products, such as a temperature as high as 35° C. at which a reaction after the hydrolysis is conducted. In addition, the molecular weight of the resultant silicone ladder polymer is limited to at the highest 100000, resulting in a difficulty in forming a thick film.

SUMMARY OF THE INVENTION

Thus, the present invention relates to:

a process for preparing a highly pure silicone ladder polymer comprising sodium, potassium, iron, copper, lead, magnesium, maganese and chlorine, each in amount of at most 1 ppm, and uranium and thorium, each in an amount of at most 1 ppb, and represented by the general formula (1):

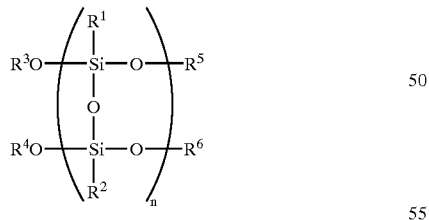

wherein $R^1$ and $R^2$ are the same or different and are selected from the group consisting of a fluorine atom, a hydrogen atom, a lower alkyl group, an alkenyl group, an aryl group, a lower alkyl group in which a part or all of hydrogen atoms are substituted with a fluorine atom, an alkenyl group in which a part or all of hydrogen atoms are substituted with a fluorine atom and an aryl group in which a part or all of hydrogen atoms are substituted with a fluorine atom; $R^3$, $R^4$, $R^5$, and $R^6$ are the same or different and are selected from the group consisting of a hydrogen atom, a lower alkyl group and a lower alkyl group in which a part or all of hydrogen atoms are substituted with a fluorine atom; and n represents an integer of 5 to 10000, which comprises:

(a) obtaining a prepolymer in which at least one organosilane compound is dissolved in an organic solvent and hydrolyzed with ultrapure water;
(b) washing the obtained prepolymer with ultrapure water; and,
(c) dissolving the washed prepolymer in an organic solvent and heating without a catalyst;

a process as described above, wherein the organosilane compound is represented by the general formula (2):

$$R^7SiOR^8OR^9OR^{10}$$

wherein $R^7$ is selected from the group consisting of a fluorine atom, a hydrogen atom, a lower alkyl group, an alkenyl group, an aryl group, a lower alkyl group in which a part or all of hydrogen atoms are substituted with a fluorine atom, an alkenyl group in which a part or all of hydrogen atoms are substituted with a fluorine atom and an aryl group in which a part or all of hydrogen atoms are substituted with a fluorine atom; and $R^8$, $R^9$ and $R^{10}$ are the same or different and are selected from the group consisting of a hydrogen atom, a lower alkyl group and a lower alkyl group in which a part or all of hydrogen atoms are substituted with a fluorine atom;

a process as described above wherein the organosilane compound is represented by the general formula (3):

$$R^{11}SiCl_3$$

wherein $R^{11}$ is selected from the group consisting of a fluorine atom, a hydrogen atom, a lower alkyl group, an alkenyl group, an aryl group, a lower alkyl group in which a part or all of hydrogen atoms are substituted with a fluorine atom, an alkenyl group in which a part or all of hydrogen atoms are substituted with a fluorine atom and an aryl group in which a part or all of hydrogen atoms are substituted with a fluorine atom;

a process for preparing a highly pure silicone ladder polymer comprising sodium, potassium, iron, copper, lead, magnesium, manganese and chlorine, each in an amount of at most 1 ppm, and uranium and thorium, each in an amount of at most 1 ppb, represented by the general formula (1):

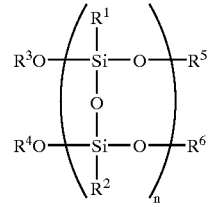

wherein $R^1$ and $R^2$ are the same or different and are selected from the group consisting of a fluorine atom, a hydrogen atom, a lower alkyl group, an alkenyl group, an aryl group, a lower alkyl group in which a part or all of hydrogen atoms are substituted with a fluorine atom, an alkenyl group in which a part or all of hydrogen atoms are substituted with a fluorine atom and an aryl group in which a part or all of hydrogen atoms are substituted with a fluorine atom; $R^3$, $R^4$, $R^5$ and $R^6$ are the same or different and are selected from the group consisting of a hydrogen atom, a lower alkyl group and a lower alkyl group in which a part or all of hydrogen atoms are substituted with a fluorine atom; and n represents an integer of 5 to 10000, which comprises:
(a) obtaining a prepolymer in which at least one organosilane compound is dissolved in an organic solvent and hydrolyzed with ultrapure water; and,
(b) dissolving the obtained prepolymer in an organic solvent and heating without a catalyst;
a process as described above wherein said organosilane compound is represented by general formula (2):

$$R^7SiOR^8OR^9OR^{10}$$

wherein $R^7$ is selected from the group consisting of a fluorine atom, a hydrogen atom, a lower alkyl group, an alkenyl group, an aryl group, a lower alkyl group in which a part or all of hydrogen atoms are substituted with a fluorine atom, an alkenyl group in which a part or all of hydrogen atoms are substituted with a fluorine atom and an aryl group in which a part or all of hydrogen atoms are substituted with a fluorine atom; and $R^8$, $R^9$ and $R^{10}$ are the same or different and are selected from the group consisting of a hydrogen atom, a lower alkyl group and a lower alkyl group in which a part or all of hydrogen atoms are substituted with a fluorine atom;
a process as described above wherein said organosilane compound is represented by general formula (3):

$$R^{11}SiCl_3$$

wherein $R^{11}$ is selected from the group consisting of a fluorine atom, a hydrogen atom, a lower alkyl group, an alkenyl group, an aryl group, a lower alkyl group in which a part or all of hydrogen atoms are substituted with a fluorine atom, an alkenyl group in which a part or all of hydrogen atoms are substituted with a fluorine atom and an aryl group in which a part or all of hydrogen atoms are substituted with a fluorine atom;
a process as described above further comprising (d) a step of pulverizing the resultant highly pure silicone ladder polymer and stirring with a poor solvent;
a process as described above further comprising (c) a step of pulverizing the resultant highly pure silicone ladder polymer and stirring with a poor solvent;
a process as described above further comprising (d) a step of passing a solution of the resultant highly pure silicone ladder polymer in an organic solvent through an impurity-removing device to effect a purification; and
a process as described above further comprising (c) a step of passing a solution of the resultant highly pure silicone ladder polymer in an organic solvent through an impurity-removing device to effect a purification.

DETAILED DESCRIPTION

The present invention is further detailed below.

The invention relates to a process for preparing a highly pure silicone ladder polymer comprising sodium, potassium, iron, copper, lead, magnesium, manganese and chlorine, each in an amount of at most 1 ppm, and uranium and thorium, each in an amount of at most 1 ppb, and represented by the general formula (1).

In general formula (1), $R^1$ and $R^2$ are selected from the group consisting of a fluorine atom, a hydrogen atom, a lower alkyl group, an alkenyl group, an aryl group, a lower alkyl group in which a part or all of hydrogen atoms are substituted with a fluorine atom, an alkenyl group in which a part or all of hydrogen atoms are substituted with a fluorine atom and an aryl group in which a part or all of hydrogen atoms are substituted with a fluorine atom. $R^1$ and $R^2$ are same or different. Each $R^1$ and each $R^2$ may be same or different from other $R^1$ and other $R^2$, respectively.

The lower alkyl group may, for example, have 1 to 7 carbon atoms. The lower alkyl group typically may be methyl group, ethyl group, n-propyl group, isopropyl group, n-butyl group, isobutyl group, t-butyl group, n-pentyl group, n-hexyl group, n-heptyl group and the like.

The alkenyl group may, for example, have 2 to 5 carbon atoms. The alkenyl group typically may be vinyl group, allyl group, 2-butenyl group, 1-pentenyl group, 2-pentenyl group, 3-pentenyl group, 1-ene-n-hexyl group, 2-ene-n-hexyl group, 3-ene-n-hexyl group, 4-ene-n-hexyl group, 2-phenylvinyl group, 3-phenylallyl group and the like.

The aryl group may, for example, for example be a phenyl group and the like.

The alkyl group in which a part or all of hydrogen atoms are substituted with a fluorine atom may, for example, for example be monofluoromethyl group, difluoromethyl group, trifluoromethyl group, pentafluoroethyl group, heptafluoropropyl group, 3-trifluoromethyl propyl group and the like.

The alkenyl group in which a part or all of hydrogen atoms are substituted with a fluorine atom may, for example, be trifluorovinyl group, pentafluoroallyl group, heptafluorobutenyl group and the like.

The aryl group in which a part or all of hydrogen atoms are substituted with a fluorine atom may, for example, be 4-fluorophenyl group, 3-trifluoromethylphenyl group, 4-trifluoromethylphenyl group and the like.

In the general formula (1), $R^3$, $R^4$, $R^5$ and $R^6$ are selected from the group consisting of a hydrogen atom, a lower alkyl group and a lower alkyl group in which a part or all of hydrogen atoms are substituted with a fluorine atom. $R^3$, $R^4$, $R^5$ and $R^6$ may be same or different.

The lower alkyl group may, for example, have 1 to 7 carbon atoms. The lower alkyl group typically may be methyl group, ethyl group, n-propyl group, isopropyl group, n-butyl group, isobutyl group, t-butyl group, n-pentyl group, n-hexyl group, n-heptyl group and the like.

The alkyl group in which a part or all of hydrogen atoms are substituted with a fluorine atom may, for example, be monofluoromethyl group, difluoromethyl group, trifluoromethyl group, pentafluoroethyl group, heptafluoropropyl group, 3-trifluoromethyl propyl group and the like.

In general formula (1), n is an integer of 5 to 10000, preferably 5 to 5000.

The silicone ladder polymer of the general formula (1) can be prepared by dissolving a prepolymer in an organic solvent and heating without a catalyst. The silicone ladder polymer of the general formula (1) may also be prepared by washing a prepolymer with ultrapure water followed by dissolving in an organic solvent followed by heating without a catalyst.

The prepolymer may, for example, be in a structure represented by the general formula (1) wherein n is 5 to 600.

Step (a): Obtaining a Prepolymer

The silicone ladder prepolymer can be produced by dissolving at least one organosilane compound in an organic solvent and then hydrolyzing with ultrapure water. The hydrolysis is conducted preferably with cooling. The silicone ladder prepolymer can for example, be prepared by the processes described in Japanese Unexamined Patent Publications No. 1994-56998, No. 1994-248083, No. 1996-245792 and No. 1999-292971.

The organosilane compound may, for example, be an organotrialkoxysilane compound of the general formula (2): $R^7SiOR^8OR^9OR^{10}$. In the general formula (2), $R^7$ is selected from the group consisting of a fluorine atom, a hydrogen atom, a lower alkyl group, an alkenyl group, an aryl group, a lower alkyl group in which a part or all of hydrogen atoms are substituted with a fluorine atom, an alkenyl group in which a part or all of hydrogen atoms are substituted with a fluorine atom and an aryl group in which a part or all of hydrogen atoms are substituted with a fluorine atom.

The lower alkyl group may, for example, have 1 to 7 carbon atoms. The lower alkyl group typically may be methyl group, ethyl group, n-propyl group, isopropyl group, n-butyl group, isobutyl group, t-butyl group, n-pentyl group, n-hexyl group, n-heptyl group and the like.

The alkenyl group may, for example, have 2 to 5 carbon atoms. The alkenyl group typically may be vinyl group, allyl group, 2-butenyl group, 1-pentenyl group, 2-pentenyl group, 3-pentenyl group, 1-ene-hexyl group, 2-ene-hexyl group, 3-ene-hexyl group, 4-ene-hexyl group, 2-phenyl vinyl group, 3-phenylallyl group and the like.

The aryl group may, for example, be a phenyl group and the like.

The alkyl group in which a part or all of hydrogen atoms are substituted with a fluorine atom may, for example, be monofluoromethyl group, difluoromethyl group, trifluoromethyl group, pentafluoroethyl group, heptafluoropropyl group, 3-trifluoromethyl propyl group and the like.

The alkenyl group in which a part or all of hydrogen atoms are substituted with a fluorine atom may, for example, be trifluorovinyl group, pentafluoroallyl group, heptafluorobutenyl group and the like.

The aryl group in which a part or all of hydrogen atoms are substituted with a fluorine atom may, for example, 4-fluorophenyl group, 3-trifluoromethylphenyl group, 4-trifluoromethylphenyl group and the like.

In the general formula (2), $R^8$, $R^9$ and $R^{10}$ are selected from the group consisting of a hydrogen atom, a lower alkyl group and a lower alkyl group in which a part or all of hydrogen atoms are substituted with a fluorine atom. $R^8$, $R^9$ and $R^{10}$ may be same or different.

The lower alkyl group may, for example, have 1 to 7 carbon atoms. The lower alkyl group typically may be methyl group, ethyl group, n-propyl group, isopropyl group, n-butyl group, isobutyl group, t-butyl group, n-pentyl group, n-hexyl group, n-heptyl group and the like.

The alkyl group in which a part or all of hydrogen atoms are substituted with a fluorine atom may, for example, be monofluoromethyl group, difluoromethyl group, trifluoromethyl group, pentafluoroethyl group, heptafluoropropyl group, 3-trifluoromethyl propyl group and the like.

The organotrialkoxysilane compound of the general formula (2) is preferably one which has previously been purified by a distillation under a nitrogen flow at a reduced pressure.

The organotrialkoxysilane compound of the general formula (2) may, for example, be, but not limited to, fluorotrimethoxysilane, fluorotriethoxysilane, fluorotripropoxysilane, trifluoromethyltrimethoxy silane, trifluoromethyltriethoxysilane, trifluoromethyltripropoxysilane, 3-trifluoromethylpropyltrimethoxysilane, 3-trifluoromethylpropyl triethoxysilane, 3-trifluoromethylpropyltripropoxysilane, 3-trifluoro methylphenyltrimethoxysilane, 3-trifluoromethylphenyltriethoxysilane, 3-trifluoromethylphenyltripropoxysilane, phenyltrimethoxysilane, phenyltriethoxysilane, phenyltripropoxysilane, 2-phenylvinyltrimethoxy silane, 2-phenylvinyltriethoxysilane, 2-phenylvinyltripropoxysilane, 3-phenylallyltrimethoxysilane, 3-phenylallyltriethoxysilane, 3-phenylallyl tripropoxysilane, trimethoxysilaine, triethoxysilane, tripropoxysilane, vinyltrimethoxysilane, vinyltriethoxysilane, vinyltripropoxysilane, allyltrimethoxysilane, allyltriethoxysilane, allyltripropoxysilane, methyltrimethoxysilane, methyltriethoxysilane, methyltripropoxysilane, ethyltrimethoxysilane, ethyltriethoxysilane, ethyltripropoxysilane, n-propyltrimethoxysilane, n-propyltriethoxysilane, n-propyltripropoxy silane and the like.

The organosilane compound may, for example, be a trichlorosilane compound of the general formula (3): $R^1SiCl_3$. In the general formula (3), $R^{11}$ is selected from the group consisting of a fluorine atom, a hydrogen atom, a lower alkyl group, an alkenyl group, an aryl group, a lower alkyl group in which a part or all of hydrogen atoms are substituted with a fluorine atom, an alkenyl group in which a part or all of hydrogen atoms are substituted with a fluorine atom and an aryl group in which a part or all of hydrogen atoms are substituted with a fluorine atoms.

The lower alkyl group may, for example, have 1 to 7 carbon atoms. The lower alkyl group typically may be methyl group, ethyl group, n-propyl group, isopropyl group, n-butyl group, isobutyl group, t-butyl group, n-pentyl group, n-hexyl group, n-heptyl group and the like.

The alkenyl group may, for example, have 2 to 5 carbon atoms. The alkenyl group typically may be vinyl group, allyl group, 2-butenyl group, 1-pentenyl group, 2-pentenyl group, 3-pentenyl group, 1-ene-n-hexyl group, 2-ene-n-hexyl group, 3-ene-n-hexyl group, 4-ene-n-hexyl group, 2-phenylvinyl group, 3-phenylallyl group and the like.

The aryl group may, for example, be a phenyl group and the like.

The alkyl group in which a part or all of hydrogen atoms are substituted with a fluorine atom may, for example, be monofluoromethyl group, difluoromethyl group, trifluoromethyl group, pentafluoroethyl group, heptafluoropropyl group, 3-trifluoromethyl propyl group and the like.

The alkenyl group in which a part or all of hydrogen atoms are substituted with a fluorine atom may, for example, be trifluorovinyl group, pentafluoroallyl group, heptafluorobutenyl group and the like.

The aryl group in which a part or all of hydrogen atoms are substituted with a fluorine atom may, for example, be 4-fluorophenyl group, 3-trifluoromethylphenyl group, 4-trifluoromethylphenyl group and the like.

The trichlorosilane compound of the general formula (3) is preferably one which has previously been purified by a distillation under a nitrogen flow at a reduced pressure. Since the purified trichlorosilane compound of the general formula (3) is hydrolyzed readily by an ambient moisture to generate hydrogen chloride, it is desired to be handled without being exposed to a moistened atmosphere.

The organotrialkoxysilane compound of the general formula (3) may, for example, be, but not limited to, fluorotrichlorosilane, trifluoromethyltrichlorosilane, 3-trifluoromethylpropyltrichlorosilane, 3-trifluoromethylphenyltrichlorosilane, phenyltrichlorosilane, 2-phenyl vinyltrichlorosilane, 3-phenylallyltrichlorosilane, trimethoxysilane, trichlorosilane, vinyltrichlorosilane, allyltrichlorosilane, methyltrichlorosilane, ethyltrichlorosilane, n-propyltrichlorosilane and the like.

First, the organosilane compound is dissolved in an organic solvent. The organic solvent in which the organosilane compound is dissolved may be a non-aqueous organic solvent in which a hydrolysate of the organosilane compound can be dissolved.

The organic solvent in which the organosilane compound is dissolved may, for example, be a ketone such as methyl isobutyl ketone (MIBK) or methyl ethyl ketone; an ether such as diethyl ether or diisopropyl ether; an aromatic hydrocarbon such as xylene, toluene or benzene; an ester such as methyl acetate, ethyl acetate or butyl acetate; an alcohol such as methyl alcohol, ethyl alcohol, propyl alcohol or butyl alcohol. The organic solvent in which the organosilane compound is dissolved is preferably a highly pure reagent suitable for use in an electronic industry (EL grade). A single organic solvent or a combination of at least two organic solvents may be employed.

Subsequently, the organosilane compound dissolved in an organic solvent is hydrolyzed with ultrapure water. It is preferred to hydrolyze the organosilane compound with cooling. The hydrolysis can be performed, for example, at a temperature of −30° C. to +40° C., preferably −20° C. to +30° C. A hydrolysis at a lower temperature causes the solidification of a droplet of ultrapure water leading to a difficulty in carrying out the hydrolysis effectively, while a hydrolysis at a higher temperature causes an uneven reaction yielding a product which tenos to be insoluble in an organic solvent.

By adding ultrapure water or ultrapure water containing hydrogen chloride dropwise to a solution of an organosilane compound in an organic solvent, the organosilane compound can be hydrolyzed. This procedure is useful especially for a hydrolysis of a compound of the general formula (2). As ultrapure water, pure water having a specific resistance of at least 16 MΩ·cm from which impurities have been removed as far as possible can be employed. Ultrapure water containing hydrogen chloride which can be employed for hydrolysis of the organosilane compound may contain 0.01 to 0.23 parts by mole of hydrogen chloride (EL grade) per 1 part by mole of the organosilane compound. After completing the dropwise addition of ultrapure water, it is preferable to continue stirring further for 1 to 5 hours to ensure completion of the hydrolysis.

After completing the reaction (hydrolysis), the reaction mixture is allowed to separate into two phases, i.e. an organic solvent layer and an aqueous layer. The organic solvent layer containing a prepolymer can be recovered, for example, by removing the lower layer (the aqueous layer) using a separation funnel.

The prepolymer can be recovered as a solution in an organic solvent, or as a liquid or a powder after distilling the solvent off.

Step (b): Washing the Prepolymer

The organic solvent layer (prepolymer) thus recovered may be washed if necessary with ultrapure water. The present invention is not limited by the washing method. Various known methods can be employed in this washing step after completing the reaction.

For example, after 100 parts by volume of an organic solvent layer is combined, for example, with 50 to 1000 parts by volume, preferably 100 to 500 parts by volume of ultrapure water and stirred or shaken, the organic solvent layer (prepolymer) is recovered, whereby effecting the washing of the prepolymer. When this washing procedure is employed, a large amount of generated chloride ion in addition to sodium ion and potassium ion in the prepolymer can readily be removed by repeating this washing procedure for at least three times. The removal of these impurities is believed to be difficult due to the incorporation of the impurities into the molecule because of the ladder structure of the prepolymer.

Step (c): Dehydration Condensation of Prepolymer

By dissolving the prepolymer in an organic solvent and heating, the silicone ladder polymer of the invention can be prepared. In the invention, the silicone ladder polymer is prepared by heating without a catalyst. The catalyst is employed in a prior art. The catalyst employed in a prior art may, for example, be a nucleophilic reagent, typically, a hydroxide compound such as sodium hydroxide, potassium hydroxide and cesium hydroxide.

In our experience, a thin film formed from a silicone ladder polymer synthesized by a conventional process sometimes generated a white fume when heated, but a thin film formed from the silicone ladder polymer synthesized by the invention did not generate a white formed even when heated. Accordingly, the invention is expected to give a substantial increase in reliability of a process in preparing a semiconductor device.

When the prepolymer is not subjected to the washing step (Step (b)) after completing the hydrolysis, it may further be dissolved, after removing an aqueous layer followed by distilling a solvent off, in an organic solvent and then may be heated. When the prepolymer is subjected to the washing step (Step (b)) after completing the hydrolysis, the prepolymer recovered as a liquid or a powder may be dissolved in an organic solvent and then may be heated. The organic solvent containing the prepolymer dissolved therein may, for example, be transferred to a quartz glass flask fitted with a fluorine resin stirrer, a condenser and a Dean-Stark trap for heating.

The organic solvent in which a prepolymer is dissolved may, for example, be a ketone such as methyl isobutyl ketone (MIBK) or methyl ethyl ketone; an ether such as diethyl ether or diisopropyl ether; an aromatic hydrocarbon such as xylene, toluene or benzene; an ester such as methyl acetate, ethyl acetate or butyl acetate; and an alcohol such as methyl alcohol, ethyl alcohol, propyl alcohol or butyl alcohol. The organic solvent in which the prepolymer is dissolved is preferably a highly pure reagent suitable for use in an electronic industry (EL grade). A single organic solvent or a combination of at least two of organic solvents may be employed.

The heating temperature may be at the lowest 40° C., preferably 40° C. to 200° C., and more preferably 50 to 150° C. A heating temperature below 40° C. may lead to a difficulty in carrying out the dehydration condensation effectively, while a higher temperature may cause an uneven reaction, yielding a product which tends to be insoluble in an organic solvent.

The heating time period may be at the shortest 0.5 hours, and preferably 0.5 to 20 hours, and more preferably 1 to 10 hours, since a prolonged reaction (heating) time gives no correspondingly increased molecular weight and may rather cause deterioration in the stereoregularity. A time period shorter than 0.5 hours may also cause a difficulty in carrying out the dehydration condensation. Thus, the silicone ladder polymer of the general formula (1) having a degree of polymerization (n) of 5 to 10000 is obtained. The degree of polymerization of the resultant silicone ladder polymer may be adjusted by selecting the type and the amount of a solvent and the temperature and the time of the condensation reaction appropriately.

Step (d): Purification of the Silicone Ladder Polymer

The silicone ladder polymer containing impurities in a trace amount if any can be purified as follows. The silicone ladder polymer recovered as a solid may be dried. When the silicone ladder polymer an not be recovered as a solid, it is added dropwise to a poor solvent after distilling a part or all of an organic solvent off whereby it is precipitated as a solid, which is then filtered and dried.

Subsequently, the solid, may be pulverized into a powder for example, using a mortar. Any pulverizing device may be employed provided that it can pulverize the solid. Then the powdered silicone ladder polymer is added to a poor solvent and stirred. Subsequently, a solid is recovered and dried. The solid may be subjected to at least one cycle each consisting of pulverization, for example, using a mortar, followed by addition to a poor solvent followed by stirring. A large number of the cycles can provide higher purity.

The silicone ladder polymer may, for example, be purified by a method employing an impurity-removing device. When the silicone ladder polymer of the general formula (1) is dissolved completely in an organic solvent, the organic solvent is subjected to an impurity-removing device to accomplish a purification of the silicon ladder polymer. Such impurity-removing device may, for example, be an ion exchanger. A large number of the cycles of this procedure can provide higher purity. Subsequently, the organic solvent is distilled off to recover the silicone ladder polymer.

Alternatively, such impurities may be removed by adding an ion exchanger to the solution of the silicone ladder prepolymer in an organic solvent followed by stirring. This procedure may be performed after neutralizing, after neutralizing followed by converting into a solution in an organic solvent, during heating or after heating. The procedure may be performed at any of these four stages which may be employed for any times in any combination.

When a silicone ladder polymer is analyzed by an infrared spectroscopy, absorption peaks assigned to the Si-O-Si asymmetric stretching vibration, which indicates that this polymer has a ladder structure, were observed at 1135 cm$^{-1}$ and 1045 cm$^{-1}$. These absorption peaks serve to ensure that the resultant polymer is a silicone ladder polymer.

In accordance of any with the processes for preparing silicone ladder polymer of the invention, a silicone ladder polymer having an extremely high purity can readily be prepared, and the resultant silicone ladder polymer has a satisfactory stability in the viscosity and can form a satisfactory film on a silicon (Si) substrate, whereby it can be employed preferably as a surface protective film and an interlaminar insulating film of a semiconductor, thus contributing to improvement in reliability in a semiconductor device.

Any of the process for preparing the silicone ladder polymer of the invention can provide a highly pure silicone ladder polymer having a high stereoregularity.

Any of the process for preparing the silicone ladder polymer of the invention allows a silicone ladder polymer especially having an extremely high purity to be produced readily and conveniently.

EXAMPLES

A process for preparing the highly pure silicone ladder polymer of the invention is further detailed in the following examples, which are not intended to restrict the invention.

Examples 1 to 4

Step (a)

Two of the organosilane compounds (various alkoxysilane compounds and trichlorosilane compounds) listed in Table 1 were distilled under a nitrogen flow at a reduced pressure. A solution containing the organosilane compounds and an organic solvent of EL grade at a ratio shown in Table 1 was transferred to a 2 L four-necked flask fitted with a dropping funnel, a thermometer and a stirrer and cooled to a temperature shown in Table 1 (hydrolysis temperature). Ultrapure water in an amount shown in Table 1 was added dropwise slowly with cooling and stirring. This reaction (hydrolysis) was not so exothermically vigorous. This dropwise addition was performed over 0.5 to 2 hours. After completing the dropwise addition, stirring was continued for 2 hours to complete hydrolysis.

Step (c)

The solution of the prepolymer thus obtained was transferred to a separation funnel, which was allowed to stand to separate into two phases. The lower aqueous layer was removed and the organic layer containing the prepolymer was recovered. Thereafter, the prepolymer was dissolved in an organic solvent shown in Table 1 and heated.

Step (d)

A reaction solution which had been heated for a predetermined period was allowed to stand to cool, and evaporated to distill an organic solvent off, and adjusted the polymer component content at a concentration indicated in Table 2 by adding purified tetrahydrofuran, stirred thoroughly to form a solution, which was added dropwise to 10 volumes of a poor solvent, from which a precipitate of a silicone ladder polymer was recovered. The silicone ladder polymer was then pulverized using a mortar and added to a poor solvent and stirred. Subsequently, the solidified silicone ladder polymer was recovered. This procedure was repeated twice to obtain the silicone ladder polymer.

Examples 5 to 8

Step (a)

Two of the organosilane compounds (various organosilane compounds and trichlorosilane compounds) listed in Table 1 were distilled under a nitrogen flow at a reduced pressure. A solution containing organosilane compounds and an organic solvent of EL grade at a ratio shown in Table 1 was transferred to a 2 L four-necked flask fitted with a drop funnel, a thermometer and a stirrer and cooled to a temperature shown in Table 1 (hydrolysis temperature).

Ultrapure water in an amount shown in Table 1 was added dropwise slowly with cooling and stirring. This reaction (hydrolysis) was not so exothermically vigorous. The dropwise addition was performed over 0.5 to 2 hours. After completing the dropwise addition, stirring was continued for 2 hours to complete the hydrolysis.

Step (c)

The prepolymer thus obtained was transferred to a separation funnel, which was allowed to stand to separate into two phases. The lower aqueous layer was removed and the organic layer containing the prepolymer was recovered. Thereafter, the prepolymer was dissolved in an organic solvent shown in Table 1 and heated.

Step (d)

A reaction solution (a solution of a silicone ladder polymer in an organic solvent) which had been heated for a predetermined period was allowed to stand to cool and subjected to an ion exchanger. This procedure was repeated twice to obtain a silicone ladder polymer.

Examples 9 to 12

A silicone ladder polymer was prepared similarly, as in Examples 1 to 4 except for repeating a procedure (step (b))

for 5 times, in each of which the lower aqueous layer of a prepolymer solution which had been allowed to separate into two phases was removed to recover an organic layer containing a prepolymer which was combined with an equal volume of ultrapure water and shaken for washing, followed by dissolving the prepolymer in an organic solvent shown in Table 1 followed by heating.

Examples 13 to 16

A silicone ladder polymer was obtained similarly, as in Examples 5 to 8 except for repeating a procedure (step (b)) for 5 times, in each of which the lower aqueous layer of a prepolymer solution which had been allowed to separate into two phases was removed to recover an organic layer containing a prepolymer which was combined with an equal volume of ultrapure water and shaken for washing, followed by dissolving the prepolymer in an organic solvent shown in Table 1 followed by heating.

(SHIMADZU, Model IC-500). The chloride ion concentrations were determined by an ion chromatography analysis (YOKOGAWA HOKUSHIN, Model IC-500). The concentrations of radioactive uranium and thorium were determined by a spectrofluoroscopy (HITACHI, Model MPF-4).

The weight average molecular weight and the sodium, potassium and chlorine contents of the obtained silicone ladder polymers are shown in Table 2. In any of the obtained silicone ladder polymers, each of the iron, copper, lead, magnesium and manganese contents was at most 0.8 ppm, and each of the uranium and thorium contents was at most 1 ppb. Based on these results, the obtained silicone ladder polymers were highly pure.

When the obtained highly pure silicone ladder polymers and the solutions thereof in anisole were stored at 25° C., any of them exhibited a constant viscosity over the shortest one year.

When any of the solutions of the obtained highly pure silicone ladder polymers in anisole was applied onto a

TABLE 1

| Ex. No. | Organic Solvent Name | Amount (ml) | Organosilane Compound Name | Amount (g) | Hydrolysis Conditions Temp. (° C.) | Ultrapure Water (ml) | HCl (mole ratio) | Heating Conditions Organic Solvent | Temp. (° C.) | Time (hours) |
|---|---|---|---|---|---|---|---|---|---|---|
| 1 | Xylene | 950 | Fluorotriethoxysilane | 30 | −10 | 150 | 0.01 | Butyl Acetate | 112 | 5 |
|   |   |   | Triethoxysilane | 70 |   |   |   |   |   |   |
| 2 | MIBK | 1250 | Triethoxysilane | 50 | 15 | 120 | 0.02 | MIBK | 116 | 2 |
|   |   |   | Vinyltriethoxysilane | 100 |   |   |   |   |   |   |
| 3 | Benzene | 1050 | Trichlorosilane | 100 | 10 | 180 | 0 | Xylene | 130 | 3 |
|   |   |   | Phenyltrichlorosilane | 100 |   |   |   |   |   |   |
| 4 | MIBK | 800 | Vinyltrichlorosilane | 75 | 0 | 160 | 0 | MIBK | 116 | 5 |
|   |   |   | Vinyltrichlorosilane |   |   |   |   |   |   |   |
| 5 | MIBK | 800 | Methyltriethoxysilane | 85 | 20 | 180 | 0.08 | MIBK | 116 | 10 |
|   |   |   | Methyltriethoxysilane | 85 |   |   |   |   |   |   |
| 6 | Diethyl Ether | 1250 | 3-Trifluoromethylpropyltriethoxysilane | 120 | −10 | 200 | 0.23 | Ethyl Acetate | 77 | 5 |
|   |   |   | Fluorotriethoxysilane | 60 |   |   |   |   |   |   |
| 7 | Toluene | 800 | Vinyltrichlorosilane | 100 | 0 | 150 | 0 | MIBK | 116 | 8 |
|   |   |   | Trichlorosilane | 30 |   |   |   |   |   |   |
| 8 | Xylene | 900 | 3-Trifluoromethylphenyltrichlorosilane | 50 | 10 | 200 | 0 | Xylene | 130 | 8 |
|   |   |   | Ethyltrichlorosilane |   |   |   |   |   |   |   |
| 9 | Toluene | 950 | Triethoxysilane | 100 | 15 | 150 | 0.08 | MIBK | 116 | 10 |
| 10 | Xylene | 1050 | Vinyltriethoxysilane | 75 | 10 | 140 | 0.1 | Xylene | 135 | 5 |
|    |   |   | Methyltriethoxysilane | 75 |   |   |   |   |   |   |
| 11 | MIBK | 1200 | Methyltrichlorosilane | 100 | 0 | 150 | 0 | MIBK | 116 | 8 |
|    |   |   | Vinyltrichlorosilane | 50 |   |   |   |   |   |   |
| 12 | MIBK | 1250 | Vinyltrichlorosilane | 50 | −10 | 100 | 0 | Toluene | 110 | 8 |
|    |   |   | Phenyltrichlorosilane | 50 |   |   |   |   |   |   |
| 13 | MIBK | 900 | Methyltriethoxysilane | 25 | 0 | 180 | 0.12 | MIBK | 116 | 10 |
|    |   |   | Fluorotriethoxysilane | 75 |   |   |   |   |   |   |
| 14 | Diethyl Ether | 1000 | 3-Trifluoromethylpropyltriethoxysilane | 100 | −20 | 150 | 0.23 | Ethyl Acetate | 77 | 2 |
|    |   |   | Methyltriethoxysilane | 100 |   |   |   |   |   |   |
| 15 | Toluene | 900 | Methyltrichlorosilane | 50 | 0 | 140 | 0 | MIBK | 116 | 5 |
|    |   |   | Trichlorosilane | 50 |   |   |   |   |   |   |
| 16 | Xylene | 800 | Vinyltrichlorosilane | 75 | 5 | 200 | 0 | Xylene | 135 | 5 |
|    |   |   | Ethyltrichlorosilane | 25 |   |   |   |   |   |   |

<Identification>

Based on the double peaks of a siloxane bond near 1100 cm$^{-1}$ observed when investigating the structure of each of the silicone ladder polymers obtained in Examples 1 to 16 by an infrared spectroscopy (NIPPON BUNKO, Model FT/IR-111) (Journal of Polymer Science, published in 1963, Vol. C-1, page 83), any of these polymers was proven to have a structure represented by the general formula (1).

<Evaluation>

The weight average molecular weights of the silicone ladder polymers obtained in Examples 1 to 16 were determined by a gel permeation chromatography (NIPPON BUNKO, Model TRI-ROTAR-). The concentrations of sodium ion, potassium ion, iron ion, copper ion and lead ion were determined by an atomic absorption analysis silicon (Si) substrate and subjected to thermosetting, a satisfactory film was obtained without forming any pinholes.

TABLE 2

| Ex. No. | Content (% by weight) | Weight Average Molecular Weight | Contents of impurities (ppm) | | |
|---|---|---|---|---|---|
|   |   |   | Na | K | Cl |
| 1 | 8 | 35000 | 0.95 | 0.85 | 0.85 |
| 2 | 10 | 25600 | 0.89 | 0.86 | 0.82 |
| 3 | 12 | 12900 | 0.68 | 0.79 | 0.91 |
| 4 | 10 | 50000 | 0.79 | 0.74 | 0.92 |
| 5 | — | 21000 | 0.84 | 0.76 | 0.79 |

TABLE 2-continued

| Ex. No. | Content (% by weight) | Weight Average Molecular Weight | Contents of impurities (ppm) | | |
|---|---|---|---|---|---|
| | | | Na | K | Cl |
| 6 | — | 31200 | 0.9 | 0.95 | 0.77 |
| 7 | — | 20000 | 0.81 | 0.92 | 0.74 |
| 8 | — | 9500 | 0.79 | 0.69 | 0.94 |
| 9 | 10 | 61200 | 0.75 | 0.77 | 0.85 |
| 10 | 11 | 53100 | 0.81 | 0.75 | 0.86 |
| 11 | 8 | 42500 | 0.88 | 0.82 | 0.79 |
| 12 | 10 | 10500 | 0.69 | 0.86 | 0.73 |
| 13 | — | 39600 | 0.91 | 0.89 | 0.78 |
| 14 | — | 12000 | 0.85 | 0.82 | 0.86 |
| 15 | — | 75100 | 0.84 | 0.81 | 0.84 |
| 16 | — | 20200 | 0.77 | 0.93 | 0.82 |

Comparative Examples 1 to 4

One of the organosilane compounds (various trialkoxy-organosilane compounds and trichlorosilane compounds) listed in Table 3 were hydrolyzed similarly to Examples 1 to 16 except for employing the compositions and the hydrolysis temperatures shown in Table 3. In Comparative Examples 1 and 3, the hydrolysis temperature was as low as −50° C., and the ultrapure water dropped was solidified without carrying out the hydrolysis, resulting in an extremely low molecular weight. In Comparative Examples 2 and 4, since the hydrolysis temperature was as high as 70° C. and the reaction temperature was also high, gelation took place in the course of the reaction.

TABLE 3

| Comparative Ex. | Organic Solvent | | Organosilane Compound | | Hydrolysis Conditions | | |
|---|---|---|---|---|---|---|---|
| | Name | Amount (ml) | Name | Amount (g) | A | B | C |
| 1 | MIBK | 900 | Triethoxysilane | 100 | −55 | 200 | 0.15 |
| | | | Fluorotriethoxysilane | 50 | | | |
| 2 | Xylene | 100 | Fluorotriethoxysilane | 100 | 70 | 180 | 0.1 |
| | | | Vinyltriethoxysilane | 100 | | | |
| 3 | MIBK | 850 | Methyltrichlorosilane | 75 | −55 | 220 | 0 |
| | | | Trichlorosilane | 25 | | | |
| 4 | Diethyl Ether | 150 | Vinyltrichlorosilane | 100 | 70 | 180 | 0 |
| | | | Trichlorosilane | 50 | | | |

Hydrolysis Conditions
A: Temperature (° C.)
B: Ultrapure Water (ml)
C: HCl (mole ratio)

What is claimed is:

1. A process for preparing a highly pure silicone laded polymer comprising sodium, potassium, iron, copper, lead, magnesium, manganese, and chlorine, each in an amount of, at most 1 ppm, and uranium and thorium, each in an amount of, at most, 1 ppb, and represented by general formula (1):

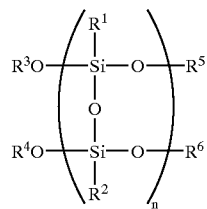

wherein $R^1$ and $R^2$ are the same or different and are selected from the group consisting of a fluorine atom, a hydrogen atom, a lower alkyl group, an alkenyl group, an aryl group, a lower alkyl group in which a part or all of hydrogen atoms are substituted with a fluorine atom, an alkenyl group in which a part or all of hydrogen atoms are substituted with a fluorine atom, and an aryl group in which a part or all of hydrogen atoms are substituted with a fluorine atom; $R^3$, $R^4$, $R^5$ and $R^6$ are the same or different and are selected from the group consisting of a hydrogen atom, a lower alkyl group, and a lower alkyl group in which a part or all of hydrogen atoms are substituted with a fluorine atom; and n represents an integer of 5 to 10000, which comprises:

(a) obtaining a prepolymer in which at least one organosilane compound is dissolved in an organic solvent and hydrolyzed with ultrapure water to obtain a prepolymer;
(b) washing the obtained prepolymer with ultrapure water; and,
(c) dissolving the washed prepolymer in an organic solvent and heating without a catalyst.

2. The process according to claim 1, wherein said organosilane compound is represented by general formula (2):

$$R^7SiOR^8OR^9OR^{10}$$

wherein $R^7$ is selected from the group consisting of a fluorine atom, a hydrogen atom, a lower alkyl group, an alkenyl group, an aryl group, a lower alkyl group in which a part or all of hydrogen atoms are substituted with a fluorine atom, an alkenyl group in which a part or all of hydrogen atoms are substituted with a fluorine atom, and an aryl group in which a part or all of hydrogen atoms are substituted with a fluorine atom; and $R^8$, $R^9$ and $R^{10}$ are the same or different and are selected from the group consisting of a hydrogen atom, a lower alkyl group, and a lower alkyl group in which a part or all of hydrogen atoms are substituted with a fluorine atom.

3. The process according to claim 1 wherein said organosilane compound is represented by general formula (3):

$$R^{11}SiCl_3$$

wherein $R^{11}$ is selected from the group consisting of a fluorine atom, a hydrogen atom, a lower alkyl group, an alkenyl group, an aryl group, a lower alkyl group in which a part or all of hydrogen atoms are substituted with a fluorine atom, an alkenyl group in which a part or all of hydrogen atoms are substituted with a fluorine atom, and an aryl group in which a part or all of hydrogen atoms are substituted with a fluorine atom.

4. A process for preparing a highly pure silicone ladder polymer comprising sodium, potassium, iron, copper, lead, magnesium, manganese, and chlorine, each in an amount of, at most, 1 ppm, and uranium and thorium, each in an amount of, at most, 1 ppb, and represented by general formula (1):

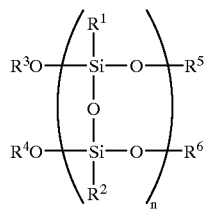

wherein $R^1$ and $R^2$ are the same or different and are selected from the group consisting of a fluorine atom, a hydrogen atom, a lower alkyl group, an alkenyl group, an aryl group, a lower alkyl group in which a part or all of hydrogen atoms are substituted with a fluorine atom, an alkenyl group in which a part or all of hydrogen atoms are substituted with a fluorine atom, and an aryl group in which a part or all of hydrogen atoms are substituted with a fluorine atom; $R^3$, $R^4$, $R^5$ and $R^6$ are the same or different and are selected from the group consisting of a hydrogen atom, a lower alkyl group, and a lower alkyl group in which a part or all of hydrogen atoms are substituted with a fluorine atom; and n represents an integer of 5 to 10000, which comprises:

(a) obtaining a prepolymer in which at least one organosilane compound is dissolved in an organic solvent and hydrolyzed with ultrapure water; and, (b) dissolving the obtained prepolymer in an organic solvent and heating without a catalyst.

5. The process according to claim 4 wherein said organosilane compound is represented by general formula (2):

$$R^7SiOR^8OR^9OR^{10}$$

wherein $R^7$ is selected from the group consisting of a fluorine atom, a hydrogen atom, a lower alkyl group, an alkenyl group, an aryl group, a lower alkyl group in which a part or all of hydrogen atoms are substituted with a fluorine atom, an alkenyl group in which a part or all of hydrogen atoms are substituted with a fluorine atom, and an aryl group in which a part or all of hydrogen atoms are substituted with a fluorine atom; and $R^8$, $R^9$ and $R^{10}$ are the same or different and are selected from the group consisting of a hydrogen atom, a lower alkyl group, and a lower alkyl group in which a part or all of hydrogen atoms are substituted with a fluorine atom.

6. The process according to claim 4 wherein said organosilane compound is represented by general of formula (3):

$$R^{11}SiCl_3$$

wherein $R^{11}$ is selected from the group consisting of a fluorine atom, a hydrogen atom, a lower alkyl group, an alkenyl group, an aryl group, a lower alkyl group in which a part or all of hydrogen atoms are substituted with a fluorine atom, an alkenyl group in which a part or all of hydrogen atoms are substituted with a fluorine atom, and an aryl group in which a part or all of hydrogen atoms are substituted with a fluorine atom.

7. The process according to claim 1 further comprising (d) pulverizing the highly pure silicone ladder polymer and stirring with a poor solvent to effect purification.

8. The process according to claim 4 further comprising (c) pulverizing the highly pure silicone ladder polymer and stirring with a poor solvent to effect purification.

9. The process according to claim 1 further comprising (d) passing a solution of the highly pure silicone ladder polymer in an organic solvent through an impurity-removing device to effect purification.

10. The process according to claim 4 further comprising (c) passing a solution of the highly pure silicone ladder polymer in an organic solvent through an impurity-removing device to effect purification.

* * * * *